March 4, 1947.  W. H. FERGUSON  2,416,916
DOLLY
Filed April 21, 1945
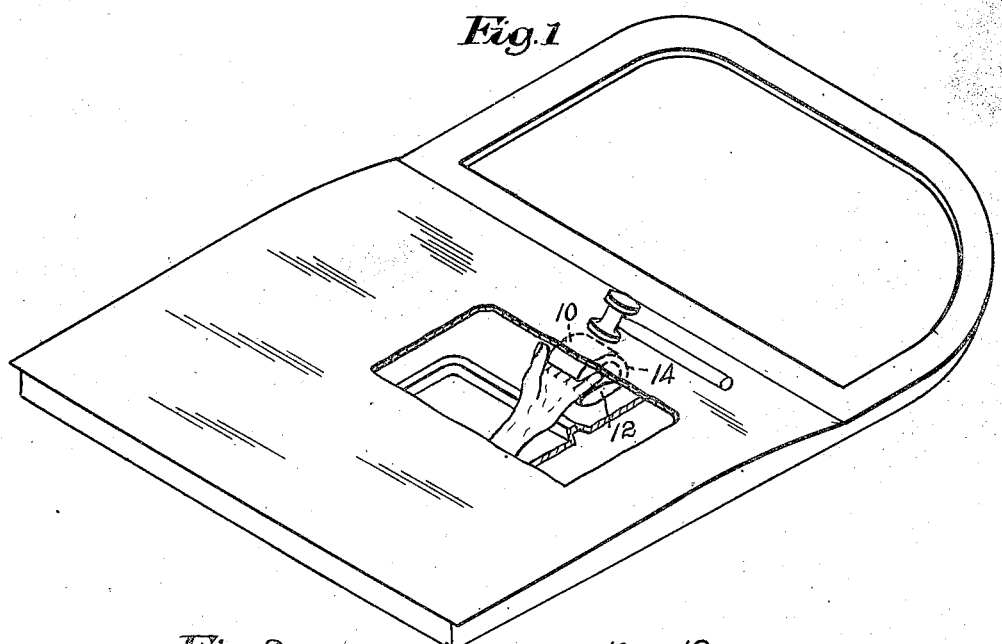
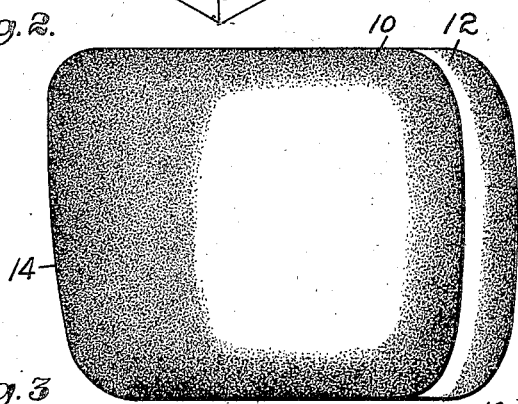
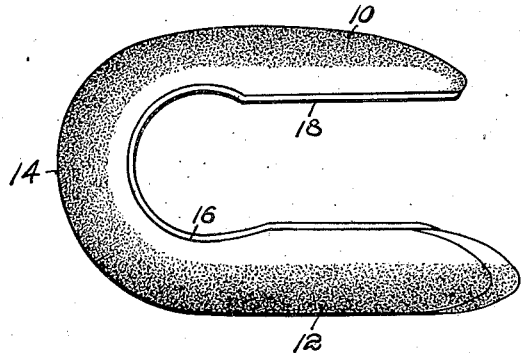
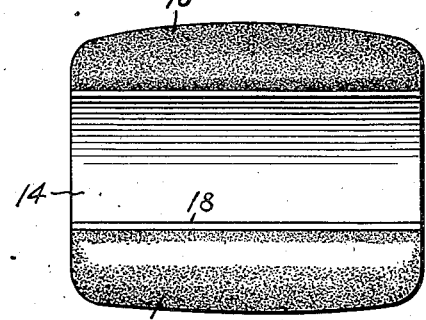
Inventor
William H. Ferguson
by Emery, Booth, Townsend, Miller & Weidner
Attys.

Patented Mar. 4, 1947

2,416,916

UNITED STATES PATENT OFFICE 2,416,916

DOLLY

William H. Ferguson, Malden, Mass., assignor to H. K. Porter, Inc., Everett, Mass., a corporation of Massachusetts Application April 21, 1945, Serial No. 589,566

2 Claims. (Cl. 81—15)

This invention relates to a dolly or hand anvil for use primarily in connection with automobile body work for restoring to form metal panels which have been dented, the dolly being held against the distorted panel while hammer blows are struck on the opposite side until the depressed portion of the panel is worked out to its original contour, to which the working face of the dolly is made to conform. The object of the invention is to provide an efficient and wieldy tool, easily supported and manipulated and capable of being applied in close places.

My invention will be well understood by reference to the following description taken in connection with the accompanying drawings, wherein:

Fig. 1 is a perspective of an automobile door with part of the exterior panel broken away to disclose the interior and shows the dolly applied to a characteristic use;

Fig. 2 is a plan view of the dolly;

Fig. 3 is a side elevation thereof; and

Fig. 4 is an end elevation thereof.

The beating out of dents in sheet metal automobile parts is relatively easy when they are found, for example, in fenders where ready access may be had to both sides. In the case of the body proper, however, many of the parts are of hollow construction and access to the inner surfaces of the exterior panels may be had only through restricted openings in the interior construction which may also be remote from the location of the injury. Moreover, the spaces may be of restricted dimensions. The construction of dolly herein disclosed permits working with it in restricted spaces and at remote locations.

Referring to the drawings, the dolly shown is a block of steel having as a whole sufficient mass (weight) to support the shock of hammer blows and having at least one face convexly contoured to correspond to the normal contour of the inner surface of the panel worked upon. The body might be considered as a bar or block of metal of suitable thickness and width doubled over on itself to provide a generally U-shaped section having opposed legs 10 and 12 and a connecting web 14, as shown in Fig. 3. Herein the dolly is reversible, each leg of the U, 10 or 12, providing a working surface, and they are substantially similar in construction although conveniently differing slightly as hereinafter explained.

Considering one leg as an example, it is of a width to extend substantially across the fingers of the hand and of a length to extend inwardly at least over the distal and medial phalanges when the fingers are inserted endwise between the legs from the open end of the U. Its thickness is such that it is substantially rigid under the hammer blows in use, although it will be understood that in the example shown the inertia of the tool which adapts it to its purposes arises from the mass of both legs. The outer surface of the leg is suitably convexly contoured to correspond to a normal contour which is encountered in the finished work and which it is desired to restore. While the surface as a whole is smoothly curved, the curvature may progressively vary as in the case of a draftsman's "French curve," the operator selecting the particular portion of the surface most suitable for the work in hand. The engaging surface opposes the panel throughout a considerable space and as the dent is hammered out comes to rest against the interior surface of the panel in its restored normal contour. In the case of a reversible tool as herein shown, the contours of the outer surfaces of the two legs 10 and 12 may be different, for instance, one "high crown" and the other "low crown," to adapt a single tool to use on panels of markedly differing curvature and one leg, as 10, may be somewhat longer than the other providing an extending portion transversely convexed across its end, which portion is applicable to certain uses in working in narrow spots, this, however, being merely incidental, the dolly when this end is being used not functioning in the characteristic manner peculiar to the present invention.

The dolly thus described is adapted to be suspended on the palmar surfaces of the outstretched fingers to permit the contoured surface of the leg so supported to be presented to the work. The opposed leg then overhangs the back of the fingers adjacent to the same but spaced therefrom, shields the backs of the fingers and also provides a counterbalancing mass which facilitates the manipulation of the tool.

The end of the inner surface of the leg, as, for instance, 10, adjacent the bend 14 of the U is preferably grooved as indicated at 16 to provide a slight shoulder for engagement by the balls of the fingers, giving the user a secure hold on the dolly, although the fingers lie substantially flat and are not curved into a grip. Conveniently also I may provide the inner surface of the legs and grooves 16 with a thin lining 18 of rubber secured thereover. This presents a soft surface to the fingers, has a certain cushioning effect and provides a good frictional grip for the fingers.

A tool as thus described may be suspended on the finger tips and inserted through any convenient opening to reach a remote place naturally and easily just as the bare hand would be reached in in an exploratory manner, and it can be carried to any point within reach of the fingers and into a space not much wider than the thickness or height of the block, viewing Fig. 3. The construction is to be distinguished from dolly blocks in which the hand is closed in a grasping position on one part thereof, thus to make a fist. At the same time a tool having adequate mass or inertia for efficient work is provided. In a narrow space the part of the U which overhangs the backs of the fingers protects them and prevents the knuckles from getting skinned both when reaching the tool into position and when the hand with the dolly vibrates during the hammering operation. The dolly supported on the outstretched fingers as described may be delicately controlled, the position of the hand corresponding to that which would be assumed in feeling for an object and thereafter manipulating the same with the finger tips, and providing for a similar exploration and positioning by the skilled operator in order to obtain quickly the best results.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A tool of the class described comprising a portable body of substantial mass to offset the shock of hammer blows substantially U-shaped in section to fit loosely over the ends of the fingers of the hand, one of the legs of the U being in the form of a generally flat plate of an area substantially to cover the palmar area of at least the distal and medial phalanges of the fingers for suspension of the tool thereby and of a thickness to provide substantial rigidity under such hammer blows, the plate having its outer surface contoured to fit the concave side of a curvilinearly contoured, sheet metal panel and support it throughout a substantial space, the other leg when the tool is so suspended extending over the backs of the fingers.

2. A tool of the class described comprising a portable body of substantial mass to offset the shock of hammer blows substantially U-shaped in section to fit loosely over the ends of the fingers of the hand, each of the legs of the U being in the form of a generally flat plate of an area substantially to cover the palmar area of at least the distal and medial phalanges of the fingers for suspension of the tool thereby and of a thickness to provide substantial rigidity under such hammer blows, the plate having its outer surface contoured to fit the concave side of a curvilinearly contoured, sheet metal panel and support it throughout a substantial space, the other leg when the tool is so suspended by one of them extending over the backs of the fingers, the under surface of the plate adjacent the turn of the U being provided with a shallow groove to engage the balls of the supporting fingers.

WILLIAM H. FERGUSON.

REFERENCES CITED

The following references are of record in the file of this patent:

UNITED STATES PATENTS

| Number | Name | Date |
| --- | --- | --- |
| 1,298,106 | Silvey | Mar. 25, 1919 |
| 1,547,863 | Dulin | July 28, 1925 |
| 1,754,994 | Ferguson | Apr. 15, 1930 |
| 205,103 | Burkle | July 9, 1878 |
| 758,263 | Machado | Apr. 26, 1904 |